(12) United States Patent
Scardino et al.

(10) Patent No.: US 6,576,774 B2
(45) Date of Patent: Jun. 10, 2003

(54) PROCESS FOR RECYCLING POLYTRIMETHYLENE TEREPHTHALATE CYCLIC DIMER

(75) Inventors: Betty Marrou Scardino, Katy, TX (US); Donald Ross Kelsey, Fulshear, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/892,306

(22) Filed: Jun. 26, 2001

(65) Prior Publication Data

US 2002/0032302 A1 Mar. 14, 2002

Related U.S. Application Data

(60) Provisional application No. 60/219,779, filed on Jul. 20, 2000.

(51) Int. Cl.$^7$ .................. C07D 323/00; C08J 11/04
(52) U.S. Cl. .................. 549/267; 528/484; 528/501; 521/48.5
(58) Field of Search .................. 528/484, 501; 521/48.1; 549/267

(56) References Cited

U.S. PATENT DOCUMENTS

| | | | |
|---|---|---|---|
| 5,459,229 A | 10/1995 | Kelsey et al. | 528/275 |
| 5,527,973 A | 6/1996 | Kelsey | |
| 5,620,665 A | 4/1997 | Kubota et al. | 422/135 |
| 5,798,433 A | 8/1998 | Schmidt et al. | 528/279 |
| 6,245,879 B1 * | 6/2001 | Kelsey et al. | |
| 6,297,330 B1 | 10/2001 | Burch, Jr. et al. | 525/444 |

FOREIGN PATENT DOCUMENTS

| | | | | |
|---|---|---|---|---|
| EP | 1016741 A1 | 5/2000 | | |
| JP | 56116721 A | 9/1981 | | |
| JP | 05230199 A | 9/1993 | | |
| JP | 10101784 A | 4/1998 | | |
| WO | WO 96/26970 | 6/1996 | | |
| WO | WO 97/08224 A1 | 3/1997 | ........... | C08G/69/16 |
| WO | WO 00/44809 | 3/2000 | | |

OTHER PUBLICATIONS

Wick et al, Cyclic Oligomers in Polyesters from Diols and Aromatic Dicarboxylic Acids, Die Angewandte Mackromoleculare Chemie 1983, 112, pp. 59–64. English abstract.*
International Search Report of Feb. 28, 2002.

* cited by examiner

*Primary Examiner*—Johann Richter
*Assistant Examiner*—Paul Zucker
(74) *Attorney, Agent, or Firm*—Donald F. Haas

(57) ABSTRACT

This invention is an improvement upon the known process for polymerization of polytrimethylene terephthalate by esterification of terephthalic acid or dimethyl terephthalate with 1,3-propane diol, precondensation of the esterification product to produce a precondensation product, and polycondensation of the precondensation product to produce polytrimethylene terephthalate and, optionally, solid stating of this product to produce higher intrinsic viscosity polytrimethylene terephthalate. The cyclic dimer of terephthalic acid and 1,3-propane diol is produced as a byproduct of the above process and the improvement comprises (a) recovering the cyclic dimer from the polymerization, (b) reacting from 0.5 to 25 percent by weight of the cyclic dimer in 1,3-propane diol in the presence of from 0.1 to 10 percent by weight of the cyclic dimer of a basic catalyst for five minutes to 24 hours at 50 to 210° C., (c) optionally neutralizing the basic catalyst in the reaction product of (b), and (d) recycling the reaction product into the polymerization process.

11 Claims, No Drawings

PROCESS FOR RECYCLING POLYTRIMETHYLENE TEREPHTHALATE CYCLIC DIMER

This application claims the benefit of U.S. Provisional Application No. 60/219,779 filed Jul. 20, 2000, the entire disclosure of which is hereby incorporated by reference.

FIELD OF THE INVENTION

This invention relates to a process of producing polytrimethylene terephthalate by esterification of terephthalic acid with 1,3-propane diol, precondensation of the esterification product to obtain a precondensation product, and polycondensation of the precondensation product to obtain polytrimethylene terephthalate. More specifically, the present invention relates to an improvement in said process wherein byproduct cyclic dimer of 1,3-propane diol and terephthalic acid is removed from the polymerization mixture, converted into polymerizable monomers, and recycled into the polymerization mixture.

BACKGROUND OF THE INVENTION

The preparation of polytrimethylene terephthalate (PTT) involves the reaction of terephthalic acid (TPA) or dimethylterephthalate (DMT) and excess 1,3-propane diol (PDO) at elevated temperatures, 240 to 275° C., optionally in the presence of an esterification catalyst such as a catalytic titanium compound, to obtain an esterification product which is usually a relatively low intrinsic viscosity PTT. This esterification product is then subjected to precondensation and finally the precondensation product is subjected to polycondensation to obtain PTT. In some processes, this is followed by solid state polymerization to increase the intrinsic viscosity of the PTT but there is a new process which can produce high intrinsic viscosity PTT without solid state polymerization.

There are several byproducts which are produced by this polymerization reaction. One of these byproducts is the cyclic dimer of PDO and TPA or DMT. This PTT cyclic dimer shown below

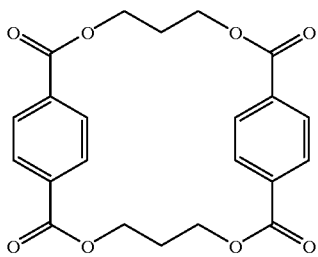

is only slightly soluble, if at all, in PDO at temperatures below about 175° C. Thus, unless the solution is held at 175° C. or above, this cyclic dimer will precipitate when the solution is cooled and accumulate as a solid in the polymerization process equipment requiring removal. Handling such solids in a process is expensive. Also, if the temperature is maintained at an elevated level, handling hot liquids increases the cost of manufacturing the product. The cyclic dimer is so volatile that it comes out of the polymer during polymerization. The process usually incorporates the step of recovering the cyclic dimer during one of the vacuum stages of the polymerization process, i.e., in precondensation or polycondensation or even in solid stating. The cyclic dimer is always in equilibrium with the polymer at elevated temperatures (about 2.5 wt % during polycondensation and about 1 wt % during solid state polymerization which is carried out at somewhat lower temperatures), so it will be replaced but this prevents it from accumulating in the polymer in the melt or solid-state reactors. However, this also causes the loss of the cyclic dimer material in the process equipment, which losses can be up to 1% or more of the total weight of polymer in the reactor. The cyclic dimer is typically recovered as a solid or as a suspension or slurry in 1,3-propanediol.

Thus, it can be seen that it would be advantageous to find a way to recycle the cyclic dimer so that the lines carrying PDO with cyclic dimer do not have to be heated to 175° C. or above and so that the cyclic dimer could be converted into PTT to enhance the overall yield of the process. The present invention provides such a process.

SUMMARY OF THE INVENTION

This invention is an improvement upon the known process for polymerization of PTT by esterification of TPA or DMT with PDO, precondensation of the esterification product to produce a precondensation product, and polycondensation of the precondensation product to produce PTT and, optionally, solid stating of this product to produce higher intrinsic viscosity PTT. The cyclic dimer of TPA or DMT and PDO is produced as a byproduct of the above process and the improvement comprises:

(a) recovering the cyclic dimer from the polymerization, (b) reacting from 0.5 to 25 percent by weight of the cyclic dimer in PDO in the presence of from 0.1 to 10 percent by weight of the cyclic dimer of a basic catalyst for five minutes to 24 hours at 50 to 210° C., (c) optionally neutralizing the basic catalyst in the reaction product of (b), and (d) recycling the reaction product into the polymerization process.

DETAILED DESCRIPTION OF THE INVENTION

PTT can be prepared by reacting 1,3-propane diol (PDO) and terephthalic acid (TPA) or dimethylterephthalate (DMT) optionally including other diols and/or aromatic diacids or diesters thereof, with removal of byproduct water (or alcohol), for a time effective to produce a polyester having an intrinsic viscosity of at least about 0.6 dl/g as measured in 60/40 phenol/tetrachloroethane at 25° C. In one variation of this process, a PDO based polyester such as PTT can be prepared in a two-stage condensation polymerization process. The first stage, melt polycondensation or esterification, includes two steps, a "pressure step" followed by a "vacuum step." In the pressure step, a molar excess of PDO is reacted with the diacid or alkyl ester thereof, optionally in the presence of added catalyst (an esterification catalyst such as a transition metal catalyst, especially titanium or tin can be used) at a temperature within the range 240 to 275° C. under atmospheric or superatmospheric pressure. Water or alcohol is produced as a byproduct and is removed by suitable means such as overhead distillation. The polymerization conditions are selected so as to produce a relatively low molecular weight polyester having an intrinsic viscosity of less than about 0.3, usually within the range of about 0.05 to about 0.25 dl/g.

For the vacuum step of the melt polycondensation, the pressure on the reaction mixture is reduced and a catalyst is usually added. The preferred polycondensation catalysts are compounds of titanium or tin, such a titanium butoxide, present in an amount within the range of about 10 to about 400 ppm titanium or tin, based on the weight of the polymer. This step is commonly divided into the precondensation stage and the polycondensation stage, mainly as a way to let the pressure down gradually. The low molecular weight product of the first step is heated at a temperature within the range of about 240 to about 275° C. under less than atmospheric pressure for a time effective to increase the intrinsic viscosity of the starting material to at least about 0.5 dl/g. During the reaction, additional water or alcohol is produced as a byproduct and is removed overhead along with excess diol. The cyclic dimer byproduct can also be removed in the overhead at this point in the reaction.

The reaction product of the melt stage is cooled, solidified, and optionally formed into pellets. The polymer can then be polycondensed in solid form ("solid-stated") at an elevated temperature less than the target polymer melt point, generally (for PTT) at a temperature greater than about 180° C. and preferably above about 200° C., under reduced pressure and/or an inert gas stream. The solid stating phase is carried out for a time, generally about four hours or more, sufficient to produce a polyester having an intrinsic viscosity of at least about 0.8, generally within the range of about 0.9 to about 1.1 dl/g.

There is also a new continuous all melt process for producing PTT which does not require the solid stating step to reach high intrinsic viscosity. This process is described in copending application Ser. No. 09/840,411, filed Apr. 23, 2001, which is herein incorporated by reference.

The cyclic dimer described above is formed as a byproduct of the reaction of PDO and TPA or DMT. The cyclic dimer occurs at levels of about 2.5 percent by weight in the melt polymer from the polycondensation step and about 1 percent by weight in the final solid stated polymer. At typical polycondensation temperatures below about 275° C., the cyclic dimer content of the PTT melt is always less than 3.0 weight percent and it's concentration is unaffected by catalysts or other additives. Unlike cyclic oligomers formed in the production of polyethylene terephthalate, i.e., polyethylene terephthalate cyclic trimer, the PTT cyclic dimer is so volatile that a significant amount can be recovered during the vacuum step of the PTT polymerization process as described above and also during the solid state polymerization under vacuum or nitrogen flow.

Although the cyclic dimer will dissolve to some extent in PDO at elevated temperatures, e.g., about 175° C. or above, it will precipitate from PDO when the solution is cooled. After it is recovered from the polymerization mixture, the cyclic dimer mixed with PDO is treated with a small amount of a basic catalyst. The basic catalyst is preferably an alkali or alkaline earth metal basic salt, such as hydroxide, carbonate, bicarbonate, and the like. Carboxylate salts, such as acetates and terephthalates also can be used as well as alkoxides, such as methoxides or ethoxides. Sodium, potassium, rubidium, magnesium, calcium, and strontium bases are preferred, most particularly sodium and potassium hydroxides and carbonates.

The amount of basic catalyst used is from 0.1 percent to 10 percent by weight, preferably from 1 to 5 percent by weight, based on the weight of the cyclic dimer. Although higher amounts of basic catalyst can be used to increase the rate of reaction of cyclic dimer in PDO, excessive amounts of basic catalysts can also interfere with the subsequent use of the PDO solution in preparing PTT polymer.

The cyclic dimer mixture in PDO generally contains from about 0.5 to 25 percent, preferably from 1 to 10 percent of the cyclic dimer by weight of the initial reaction mixture. In either case, the final reaction mixture product can be combined with additional PDO, if desired, before being added back to the polymerization process.

The reaction of the cyclic dimer with PDO in the presence of the basic catalyst is conducted at temperatures from 50 to about 210° C., preferably from 80 to 180° C., and most preferably from 100 to 150° C. The reaction time will depend upon the temperature used but it can be as little as five minutes up to 24 hours or more. Typically, the reaction time ranges from 10 to 150 minutes at the preferred temperatures. When the reaction mixture is cooled to room temperature, a very small amount of precipitate, typically less than about 10 percent of the cyclic dimer charged, may be formed. This precipitate can be easily removed, if desired, by filtration.

Based on NMR analysis, we believe that most of the cyclic dimer is converted into linear diesters such as

where x is 1 or 2, which are more soluble in PDO. This reaction mixture can then be used, in whole or in part, for the preparation of high molecular weight PTT. If desired, the basic catalyst may be partially or completely neutralized prior to subsequent preparation of PTT by addition of a non-oxidizing acid such as phosphoric acid, organosulfonic acid, hydrochloric acid, and the like, or by passing the solution through an acidic ion exchange resin. However, under the preferred conditions described, such neutralization should not be necessary in order to use the reaction product for PTT manufacture.

The purity of the cyclic dimer which has been removed from the polymerization mixture, generally ranges from about 10 percent to about 100 percent by weight pure, usually from about 50 to about 95 percent by weight pure. The remainder is typically PTT polymer and oligomers. The above process steps convert the PTT polymer and oligomers, at least in part, to derivatives soluble in PDO and are also recycled into the polymerization process.

The reaction mixture may be recycled into the polymerization process at any stage prior to the polycondensation step. It is preferred that it be added to the feed, most preferably the PDO feed or a PDO/TPA paste feed. It can also be added during esterification.

EXAMPLES

Example 1

Treatment with $K_2Co_3$ and Heat

A flask with a magnetic stir bar was charged with 38 gm of PDO (99+%), 2 gm of cyclic dimer (93.4%), and 0.05 gm (~2.7% base: cyclic dimer) of potassium carbonate. The mixture was heated while stirring in an oil bath at temperature of 80° C. for about 2 hours and then 135° C. for about 1 hour, after which time the cyclic dimer had disappeared and did not reappear on cooling the reaction mixture to room temperature.

Example 2

A serum bottle with stir bar was charged with 0.125 gm cyclic dimer (93.4%), 2.375 gm PDO (99+%), and 0.0025 gm (2.1%) potassium carbonate. The flask was heated in an oil bath at 1 hour intervals to 75, 100, 125, 150, 175 and 200° C. At 125° C. the solid disappeared and on cooling a very small amount of precipitate reappeared. The precipitate was collected and found to be 0.0104 gm or 8.32% of the original amount of solid.

Example 3

This experiment was carried out in a manner similar to Example 1 using 9.5 gm of PDO, 0.5 gm 99+% cyclic dimer, and 0.005 gm (1%) potassium carbonate. The mixture was heated to 125° C. for 1 hour. All the solid had disappeared and on cooling to room temperature a small amount of precipitate reappeared.

Example 4

This experiment was carried out in a manner similar to Example 1 using 3.4 gm cyclic dimer (99+%), 64.6 gm PDO, and 0.034 gm (1.0%) potassium carbonate. The mixture was heated to 125° C. for 1 hour and the solid disappeared. When the solution was cooled to room temperature a small amount of precipitate reappeared. The solution was filtered, the precipitate was rinsed with water, dried, and 0.046 gm of precipitate (1.4%) was collected. Both the precipitate and the PDO solution were examined by NMR. The analysis showed that the precipitate was about 99.3% linear dimer of PTT and 0.7% cyclic dimer of PTT. The PDO solution was comprised of about 2% of the PDO diester of TPA and about 98% propane diol.

The PDO phase from this experiment was used in a standard polymerization to produce polytrimethylene terephthalate. Thus, a 600 mL stainless steel pressure reactor fitted with a distillation column, condenser, and collection vessel was charged with 60.0 gm of the reaction product (~0.79 mole PDO) and 93.5 gm terephthalic acid (~0.56 mole). The reactor was pressurized to 50–80 psi (345–552 kPa) with nitrogen and pressure was released five times to degas. Then it was repressurized to 20 psi (138 kPa) and heated to 250° C. For two hours the pressure was maintained near 50 psi (345 kPa) and then lowered in 10 psi (69 kPa) increments each hour thereafter. After a total of about 6 hours any remaining pressure was released and the aqueous distillate was collected, weighed, and analyzed by GC. The molten oligomer was poured into a pan and allowed to cool. 120 gm of the oligomer and 0.06 gm titanium butoxide were charged to a 500 mL 3-neck flask. The flask was degassed with nitrogen and evacuated to 200 mbar (20 kPa) with a small nitrogen sweep, heated in an oil bath to 260° C., stirred at about 20 rpm, and the pressure reduced to about 1 mbar (0.1 kPa). After 3 hours, the reaction mixture was cooled and the polymer was isolated.

The intrinsic viscosity (IV) was measured in hexafluoroisopropanol. The ratio of cyclic dimer (CD) to PTT polymer and the ratio of PDO repeat units to dipropylene glycol (DPG) repeat units was measured by proton NMR. The yellowness index (YI) of the polymer was measured on a molded plaque by reflectance with a Gardner Colorguard system 105 according to ASTM D-1295. Results are compared to two polymer samples, A and B, prepared similarly with polymerization grade PDO in the Table below.

TABLE 1

| PTT | IV (dl/g) | YI | % cyclic dimer | % DPG (weight) |
|---|---|---|---|---|
| Example 4 | 1.15 | 34.3 | 2.3 | 1.7 |
| A | 1.14 | 23.9 | 2.4 | 6.9 |
| B | 1.33 | 29.0 | 2.4 | 4.0 |

The polymerization with the reaction product in PDO gave PTT of similar molecular weight, measured by IV (at room temperature in hexafluoroisopropanol), to that prepared with pure PDO (>99.5w). The corresponding IV's in 60/40 phenol/tetrachloroethane are calculated to be 0.98, 0.97, and 1.11 for Examples 4, A, and B, respectively. The amount of cyclic dimer in the final polymer was also similar. The amount of DPG was reduced, which may also be favorable. The lower amount of DPG in Example 4 shows one reason why one may not want to neutralize the base.

Examples 5–8
Reactions with Other Bases

Example 5 was conducted similarly to Example 1 using 1.0 gm cyclic dimer (99+%), 19.0 gm PDO, and 0.010 gm (1%) sodium hydroxide. The mixture was heated to 125° C. for 1 hour. After 1 hour all but a few flakes of solid disappeared. On cooling a small amount of precipitate reappeared.

Example 6 was conducted similarly to Example 1 using 0.5 gm cyclic dimer (99+%), 9.5 gm PDO, and 0.010 gm (2%) sodium hydroxide. The mixture was heated to 125° C. for 1 hour. After 1 hour the solution was clear and on cooling a small amount of precipitate appeared. The solution was filtered and the precipitate rinsed in water and dried. 0.028 gm of precipitate (5.6%) was collected. The precipitate was examined by NMR and found to be about 50% cyclic dimer of PTT and 50% linear dimer of PTT.

Example 7 was conducted similarly to Example 1 using 0.5 gm cyclic dimer (99+%), 9.5 gm PDO and 0.010 gm (2%) calcium carbonate. The mixture was heated to 125° C. for 4 hours. No apparent change occurred. It is unknown why this did not work. Potassium carbonate (Ex. 2) and calcium hydroxide (Ex. 8) are effective. Perhaps more catalyst is necessary.

Example 8 was conducted similarly to Example 1 using 0.5 gm cyclic dimer (99+%), 9.5 gm PDO, and 0.010 gm (2%) calcium hydroxide. The mixture was heated to 125° C. for 1 hour. After 1 hour no solid was apparent but the solution was slightly cloudy. An additional 0.10 gm of calcium hydroxide was added and the solution was heated for another hour. The solution remained cloudy. The solution was filtered and the precipitate rinsed with water and dried. 0.0016 gm of precipitate (0.3%) was collected.

Examples 9–16
PDO and Cyclic Dimer of PTT with other Reactants

Comparative Examples 9–12. Four serum bottles with stir bars were charged with 0.5 gm of cyclic dimer (93.4%), 10 gm of PDO (99+%), and either 0.002 gm phosphoric acid, 0.002 gm para-toluenesulfonic acid [pTSA], 0.014 gm titanium butoxide, or no additional reactant. The bottles were heated while stirring in an oil bath for 8 hours at 40–60° C., followed by 8 hours at about 85° C., 6 hours at 135° C., and 6 hours at 160° C. No apparent reactions occurred in any of the bottles.

Comparative Examples 13–16. Five serum bottles (10 mL) with stir bars were charged and heated according to the following tables.

TABLE 2

| Example* | Cyclic Dimer (gm) | PDO (gm) | Reactant | Reactant (gm) |
|---|---|---|---|---|
| 13 | 0.125 | 2.375 | p-TSA | 0.0005 |
| 14 | 0.125 | 2.375 | H$_3$PO$_4$ | 0.0006 |
| 15 | 0.125 | 2.375 | none | — |
| 16 | 0.528 | 4.75 | none | — |

*#13 through 16 used 93%/7% cyclic dimer/PTT. #17 used 99+% cyclic dimer.

TABLE 3

| | 75° C. | 100° C. | 125° C. | 150° C. | 175° C. | 200° C. | Cooling |
|---|---|---|---|---|---|---|---|
| 13 | N | N | N | N | P | P | solid reformed |
| 14 | N | N | N | N | P | P | solid reformed |

TABLE 3-continued

| | 75° C. | 100° C. | 125° C. | 150° C. | 175° C. | 200° C. | Cooling |
|---|---|---|---|---|---|---|---|
| 15 | N | N | N | N | P | P | solid reformed |
| 16 | N | N | N | N | Y | Y | solid reformed |

N - No apparent reaction
Y - Solid disappeared
P - Partial solid disappearance

The samples exhibited some dissolution of cyclic dimer at temperatures greater than 175° C., but the cyclic dimer then precipitated when the solutions were cooled to room temperature.

We claim:

1. In a process for the polymerization of polytrimethylene terephthalate by esterification of terephthalic acid or dimethylterephthalate with 1,3-propane diol, precondensation of the esterification product to produce a precondensation product, and polycondensation of the precondensation product to produce polytrimethylene terephthalate and, as a byproduct, the cyclic dimer of terephthalic acid and 1,3-propane diol, the improvement which comprises:

(a) recovering the cyclic dimer from the polymerization,
   (b) reacting from 0.5 to 25 percent by weight of the cyclic dimer in 1,3-propane diol in the presence of from 0.1 to 10 percent by weight of the cyclic dimer of a basic catalyst for five minutes to 24 hours at 50 to 210° C.,
   (c) optionally neutralizing the basic catalyst in the reaction product of (b), and
   (d) recycling the reaction product into the polymerization process.

2. The process of claim 1 wherein the process includes at least one vacuum step and a cyclic dimer is recovered from the polymerization mixture during the vacuum step.

3. The process of claim 1 wherein from 1 to 5 percent by weight of the cyclic dimer of a basic catalyst is used.

4. The process of claim 1 wherein the cyclic dimer comprises from 1 to 10 percent by weight of the solution in 1,3-propane diol.

5. The process of claim 1 wherein the reaction of step (b) is carried out at 80 to 180° C.

6. The process of claim 5 wherein the reaction of step (b) is carried out at 100 to 150° C.

7. The process of claim 1 wherein the reaction of step (b) is carried out for from 10 to 150 minutes.

8. The process of claim 1 wherein the basic catalyst is selected from the group consisting of alkali and alkaline earth metal basic salts.

9. The process of claim 8 wherein the basic catalyst is selected from the group consisting of alkali and alkaline earth metal hydroxides, carbonates, bicarbonates, carboxylates, and alkoxides.

10. The process of claim 9 wherein the basic catalyst is selected from the group consisting of alkali or alkaline earth metal, acetates, terephthalates, methoxides, and ethoxides.

11. The process of claim 9 wherein the basic catalyst is selected from the group consisting of sodium hydroxide, potassium hydroxide, sodium carbonate, and potassium carbonate.

* * * * *